US006748202B2

(12) United States Patent
Syrjärinne et al.

(10) Patent No.: US 6,748,202 B2
(45) Date of Patent: *Jun. 8, 2004

(54) METHOD, APPARATUS AND SYSTEM FOR SYNCHRONIZING A CELLULAR COMMUNICATION SYSTEM TO GPS TIME

(75) Inventors: Jari Syrjärinne, Tampere (FI); Harri Valio, Lempäälä (FI)

(73) Assignee: Nokia Corporation, Espoo (FI)

( * ) Notice: Subject to any disclaimer, the term of this patent is extended or adjusted under 35 U.S.C. 154(b) by 238 days.

This patent is subject to a terminal disclaimer.

(21) Appl. No.: 10/016,140

(22) Filed: Dec. 12, 2001

(65) Prior Publication Data

US 2003/0109264 A1 Jun. 12, 2003

(51) Int. Cl.⁷ .................................................. H04B 1/06
(52) U.S. Cl. ...................... 455/255; 455/427; 455/502; 342/357.01; 342/357.06
(58) Field of Search .............................. 455/456.1, 457, 455/427, 12.1, 502, 550.1, 552.1, 132, 255; 342/357.01, 357.02, 357.06, 357.12

(56) References Cited

U.S. PATENT DOCUMENTS

| | | | |
|---|---|---|---|
| 5,945,944 A | * | 8/1999 | Krasner .................. 342/357.06 |
| 6,041,222 A | | 3/2000 | Horton et al. |
| 6,122,506 A | * | 9/2000 | Lau et al. .................... 455/427 |
| 6,150,980 A | * | 11/2000 | Krasner .................... 342/357.1 |
| 6,178,195 B1 | | 1/2001 | Durboraw, III et al. |
| 6,346,911 B1 | * | 2/2002 | King ........................ 342/357.06 |
| 6,433,734 B1 | * | 8/2002 | Krasner .................. 342/357.09 |
| 6,452,541 B1 | * | 9/2002 | Zhao et al. ............. 342/357.06 |
| 6,678,510 B2 | * | 1/2004 | Syrjarinne et al. .......... 455/255 |

FOREIGN PATENT DOCUMENTS

WO    WO 97/14056    4/1997

OTHER PUBLICATIONS

Tuomas Kinnari, Accurate Time Transfer in Assisted GPS, M.Sc. Thesis, May 9, 2001, Tampere, Finland.
Accuracy of EU GPS Timing of Cell Frames for LCS, TSG–RAN Working Group 4 (Radio) meeting #19, R4–011187, Sep. 7, 2001; Edinburg, Scotland.
3GPP TS 25.331 V3.8.0 (Sep. 2001), Technical Specification, 3rd Generation Partnership Project; Technical Specification Group Radio Access Network; RRC Protocol Specification (Release 1999) Sep., 2001.

* cited by examiner

*Primary Examiner*—Sonny Trinh
(74) *Attorney, Agent, or Firm*—Ware, Fressola, Van Der Sluys & Adolphson LLP

(57) ABSTRACT

A ranging receiver (10) including a cellular module (11), for providing time according to a positioning system to enable synchronizing a wireless system to the positioning system. The ranging receiver (10) includes both the cellular module (11) and a main module (12) that provides ranging receiver functionality. When the cellular module (11) receives a time-stamped frame from the wireless system, it sends a trigger signal over a special hardware path to the main module (12), which then relates the time of trigger receipt to time according to the positioning system by calculating a position-velocity-time (PVT) solution, using a local clock (18) to get the difference in time between receipt of the trigger and the instant to which the PVT solution applies, and then communicates to the cellular module (11) when it received the trigger, according to positioning system time.

17 Claims, 2 Drawing Sheets

METHOD, APPARATUS AND SYSTEM FOR SYNCHRONIZING A CELLULAR COMMUNICATION SYSTEM TO GPS TIME

CROSS REFERENCE TO RELATED APPLICATIONS

Reference is made to U.S. application entitled METHOD, APPARATUS AND SYSTEM FOR GPS TIME SYNCHRONIZATION USING CELLULAR SIGNAL BURSTS, filed on Feb. 5, 2001, having application Ser. No. 09/777,521.

The above referenced application is assigned to the present assignee, and is hereby incorporated by reference.

FIELD OF THE INVENTION

The present invention relates to navigating using a global positioning system (GPS), and in particular to systems for providing assisted-GPS and for providing GPS time recovery, especially in weak signal conditions.

BACKGROUND OF THE INVENTION

The operation of a global positioning system (GPS) receiver is predicated on the receiver having a precise value for GPS time; without such a precise value, the ranges (from the receiver to one or more of the GPS satellites) computed by the receiver are inaccurate, since they are determined simply as the difference between the time of transmission and time of receipt multiplied by the speed of light. GPS navigation therefore relies on all elements of GPS (including both satellites and GPS earthbound receivers) having a clock synchronized to GPS system time, which is an approximate version of so-called coordinated universal time (UTC). GPS (more specifically, the GPS ground monitoring network) disseminates corrections to each satellite (which uses a high accuracy local clock) to account for the bias and offset of the satellite clock compared to GPS system time, and the satellites provide these corrections in the navigation message they each broadcast; therefore all satellites are synchronized. A GPS receiver, on the other hand, determines the offset of its local clock as part of the solution of the GPS receiver position. In doing so, however, to the extent that the GPS local clock is significantly out of synchronization, the calculation of the GPS receiver position is prolonged. Therefore, it is advantageous, in general, to provide a means of synchronizing a GPS receiver clock to GPS system time.

In sufficiently weak GPS signal conditions, a GPS receiver cannot determine GPS time unassisted. In such conditions, either the exact GPS time has to be recovered to carry out positioning, or positioning must stop. To avoid having to halt positioning, time recovery must be assisted, and there are many ways to assist a GPS receiver in carrying out time recovery, one being to deliver the exact GPS time from a cellular network, such as a GSM network.

Unfortunately, a standard GSM network (and also a third generation wideband code division multiple access network) is not synchronized to any universal time reference, since cellular communication is not per se a navigation tool and therefore there is no need for a universal synchronized time in providing cellular communications. The only time synchronization that is often needed is time slot synchronization, where a mobile station synchronizes itself to a particular base station schedule in order to keep its own transmission in its assigned time slot and to pick up the messages from the base station intended for the mobile station. Such synchronization is therefore (and need only be) relative (between a mobile station and a base station) as opposed to universal. To enable deriving a universal time from such a cellular network, new equipment and new messages are needed.

There is a device that provides a GPS/GSM timing relationship (mapping); it is called a Location Measurement Unit (LMU); an LMU can be thought of as a specialized GPS receiver located at a cellular base station, a GPS receiver adapted to time-stamp with GPS system time communication signal bursts to mobile stations. An LMU time-stamps with GPS time the communication signal bursts from base stations. An LMU provides to a GPS receiver (a GPS receiver configured to make use of the LMU provided information) the help needed in weak signal conditions in constructing GPS time (i.e. in synchronizing with GPS system time). The LMU provides a so-called reference time information element, in which it indicates which GSM signal frame, time slot and bit are to be used as a time reference point, according to which for example a mobile station can remove the GSM system delay, and so recover exact GPS time.

For typical GPS receiver positioning accuracy, GPS time must be known to within ~10 $\mu$s in the receiver. Such accuracy is difficult to achieve using an LMU-based system for time synchronization, but co-owned U.S. application Ser. No. 09/777,521, filed Feb. 5, 2001, hereby incorporated by reference, provides a solution. According to the art prior to that application, a GPS receiver is adapted to make use of LMU assistance by including a cellular component, in addition to the GPS component, that responds to the LMU message (including picking up the actual trigger in the indicated signal frame, time slot, and bit) (see FIG. 1). The two components communicate via a software messaging layer. There are, however, significant random delays in communicating messages over a software messaging layer, i.e. internal delays arising because of use of the software messaging layer for various other tasks besides only providing LMU time synchronization information. (Random delays occur inside buses used by a GPS receiver, buses where messages are transmitted from one software module to another using a dedicated software messaging architecture. Such delays can be tens of milliseconds in duration.) U.S. application Ser. No. 09/777,521 provides a special hardware connection (see FIG. 1) between the GPS component and the cellular component that is used to signal to the GPS component the precise time of arrival of a time-stamped frame indicating an instant of time having a value according to GPS time that is conveyed by another frame to the cellular component and then communicated over the software messaging layer to the GPS component.

Thus, an LMU is used, especially in poor signal conditions, to synchronize a GPS component to GPS time. In many places, however, base stations are not equipped with an LMU. In such situations, it would be advantageous if a GPS receiver, including both a GPS component and a cellular component, that could synchronize itself to GPS time because of operating in favorable signal conditions, could then communicate GPS time to GPS receivers (also including both a cellular component and a GPS component) operating in less favorable signal conditions and in places where services from an LMU are not available.

SUMMARY OF THE INVENTION

Accordingly, in a first aspect of the invention, an apparatus is provided comprising: a cellular module, responsive to a portion of a downlink frame signal conveying a cellular frame provided by a cellular communication system; and a main module, responsive to ranging signals from beacons of a positioning system in which time is kept according to a predetermined time reference; the apparatus characterized in that: the cellular module provides a trigger signal indicating the arrival of the portion of the downlink frame signal, and is further responsive to a signal indicating information for relating the instant at which the trigger signal is provided to a time value according to the predetermined time reference; and the main module provides the signal indicating the information for relating the instant at which the trigger signal is provided by the cellular module to a time value according to the predetermined time reference; wherein the trigger signal is provided over a connection between the cellular module and the main module so constructed that any delay between sending and receiving the trigger signal is either negligible or can be determined.

According to the first aspect of the invention, the apparatus may be further characterized by the main module comprising a timing register and a local clock, the timing register responding to the trigger signal by reading the local clock to determine a local trigger time and holding the local trigger time until being reset or until another trigger signal is issued by the cellular module. The apparatus may be further characterized in that the main module further comprises a main processor, responsive to the ranging signals and to the value stored in the timing register and to the local time as indicated by the local clock, for determining a navigation solution including a preliminary time value according to the predetermined time reference, the preliminary time value being a time value for the instant of time for which the navigation solution is determined, and for adjusting the preliminary time value by the difference in time according to the local clock when the timing register was triggered and when the navigation solution was determined, thereby providing the time value, according to the predetermined time reference, for the instant when the timing register was triggered.

Also according to the first aspect of the invention, the apparatus may be further characterized in that it further comprises a time slot counter, and the trigger pulse is provided when the time slot counter indicates a new time slot.

Also according to the first aspect of the invention, the apparatus may be further characterized in that it further comprises a data bit counter, and the trigger pulse is provided when the data bit counter indicates a new data bit.

Also according to the first aspect of the invention, the apparatus may be further characterized in that the main module is a global positioning system (GPS) module providing functionality for operation as a GPS receiver.

Also according to the first aspect of the invention, the apparatus may be further characterized in that the cellular module provides to a serving base station the information for relating to a time value according to a predetermined time reference, the instant at which the trigger signal is provided. Further, the main module may also provide a position for the instant when the trigger signal was received by the main module, and the cellular module may be responsive to the position, and provide the position to the serving base station.

Also according to the first aspect of the invention, a system is provided comprising an apparatus according to the first aspect of the invention, which receives a cellular frame, and further comprising a cellular base station, for providing the cellular frame.

Also according to the first aspect of the invention, a system is provided comprising an apparatus according to the first aspect of the invention, which receives ranging signals from beacons of a positioning system, and further comprising the beacons of the positioning system that provide the ranging signals.

In a second aspect of the invention, a method is provided for having a ranging receiver, able to be used with a positioning system and including a cellular module and a main module, provide information to a serving base station of use in enabling the serving base station to synchronize to time according to the positioning system, the method characterized by: a step in which the cellular module detects a portion of a time-stamped frame and applies a trigger signal to a connection linking the cellular module to the main module, a connection such that any delay between applying a signal and receiving the signal is either negligible or can be determined; and a step in which the main module sends to the cellular module a time value according to the positioning system for the instant when the main module received the trigger signal, based on performing a navigation solution yielding a time value for an instant of time able to be related to the instant of time when the trigger signal was received using a local clock accessible to the main module.

According to the second aspect of the invention, the method may be further characterized by a step in which the main module determines the difference in time between the time for which the navigation solution was obtained and the time when the trigger signal arrived at the main module, based on using a local clock and a timing register latchable by the trigger signal so as to hold a time value according to the local clock for when a trigger signal arrives.

Also according to the second aspect of the invention, the method may be further characterized in that in the step in which the main module sends to the cellular module a time value, the main module also sends the cellular module a signal indicating information about the position of the ranging receiver.

The invention allows a time stamp to be made in a mobile device, so that the mobile device serves the function of an LMU, thus eliminating the need of having a separate LMU. In addition, the accuracy of the invention is improved over what is typically provided by an LMU; the accuracy provided by the invention is for example in the range of 1–2 $\mu$s.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 1:
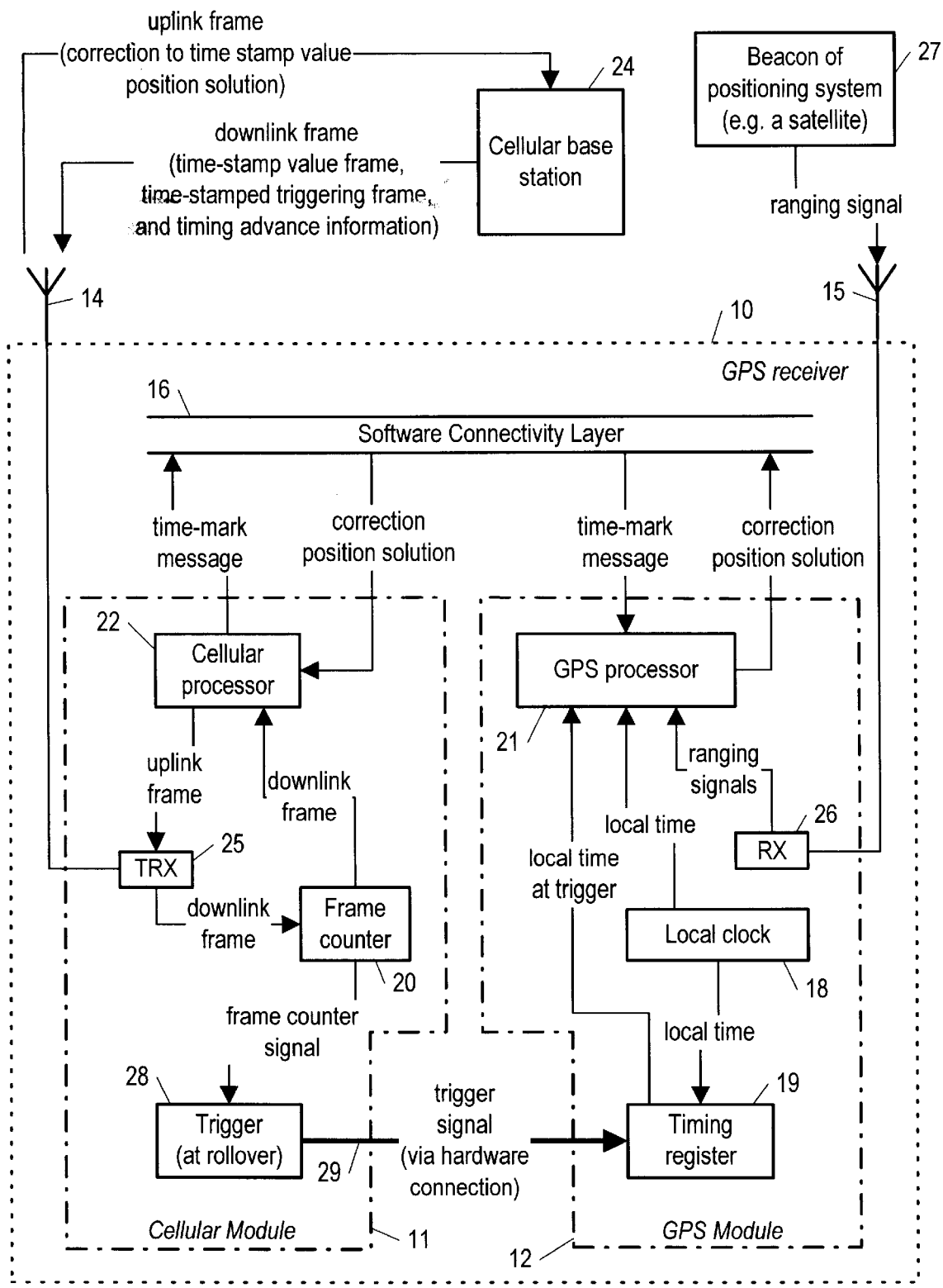
FIG. 1 is a simplified illustration of a GPS receiver including both a cellular component and a GPS component with a special hardware connection between them, according to the present invention.

Referring now to FIG. 1, a global positioning system (GPS) receiver 10 according to the invention is shown as including a cellular module 11 (not necessarily providing a complete cellular communication capability) and a GPS module 12. The cellular module responds to a cellular communication signal through a cellular antenna 14. The GPS module includes standard GPS hardware 21 for responding to GPS ranging signals (including navigation data) received via a GPS antenna 15 after being broadcast by beacons 27 of the positioning system (such as GPS satellites, but also possibly ground-based beacons). The cellular module processes cellular communication signals so as to extract time synchronization information, such as from a Location Measurement Unit (LMU) message, as described above. The cellular communication signal consists of data organized into frames, including delimiters (headers and footers) enabling the cellular module to distinguish one frame from the next. The cellular module includes a frame counter 20 for counting downlink frames (transmitted by a base station to the cellular module). The frame counter also detects the frame edges, which are used, e.g., in frequency reconstruction. In detecting or identifying a frame edge, the frame counter provides an indication of the instant when a new frame is received. In GSM cellular communication, there could also be a time-slot counter and a bit counter, with corresponding edge detectors.

The GPS receiver 10 also includes a software messaging layer 16, by which the cellular module and GPS module communicate messages, but messages so communicated are subject to random delays in being delivered because of other message traffic being communicated via the software messaging layer (message traffic for example between different components of the GPS module).

Every time the frame counter indicates the arrival of a new cellular communication signal downlink frame (and in particular, a new frame edge), a trigger pulse is generated and communicated to the GPS module via a special hardware path 23 having either essentially no delay or a delay that is known and so can be taken into account, i.e. providing the trigger pulse substantially free of random delay. The trigger pulse is used to latch a register 19 in the GPS module, a register called here a timing register, so that the register stores internal time (not UTC time), i.e. the time indicated by the GPS receiver oscillator/local clock 18. (The GPS receiver local clock 18 is typically implemented as an internal counter, as part of the GPS hardware. The latching results in either storing the current value of the local clock in the register or resetting the internal counter. The local clock 18 may or may not be actually a part of the GPS module, but is accessible to components of the GPS main module even if it is not a part of the GPS main module.)

Still referring to FIG. 1, as explained in co-pending and co-owned application Ser. No. 09/777,521, in places where there is an LMU and in poor signal conditions where it is helpful for the GPS receiver 10 to be assisted by the base station 24 (hosting an LMU, not shown), when a trigger pulse is generated by a trigger module 16 of the cellular module 11, as the trigger pulse is being generated and provided via the special hardware path 23 to the timing register 19 of the GPS module 12, the corresponding frame number (or alternatively the time slot or bit number, as explained below) is transmitted to the GPS hardware 21 via the software messaging layer 16. If the GPS hardware has already been set to GPS time (by a procedure described below), it remains synchronized by stabilizing the local clock using the trigger pulses, and so countering clock drift. To set GPS time in the GPS module to begin with, however, i.e. when the GPS receiver is powered on, the cellular model uses a time-stamp it receives from an LMU 22 at a nearby base station; the time-stamp specifies that an indicated GPS time is to be associated with receipt of an indicated frame number, time slot and bit number; the frame referenced in the time-stamp is a frame that was already transmitted (either broadcast or transmitted point-to-point to the GPS receiver). The time-stamp includes GPS time associated with the frame, time slot, and bit. (The time stamp does not, however, include propagation delay. There is no way to know in the LMU, how far the GPS receiver is from the serving base station where the LMU is located. Propagation delay over the air interface is compensated for in various ways; e.g. in GSM, propagation delay is often compensated for using a so-called Timing Advance (TA) measurement made by the cellular system. TA is measured from a round trip delay between the receiver and the serving base station.)

As also explained in U.S. application Ser. No. 09/777,521, once the cellular module 11 has the time-stamp (value), the cellular module can prepare what is here called a time-mark message (as opposed to a time-stamp message); a time-mark message indicates the GPS time to be associated with a yet-to be-received frame. As soon as the frame indicated in the time-mark message is received, a trigger pulse is sent to the GPS module along the special hardware path 23, and the frame number and time-mark message are communicated to the GPS module via the software messaging layer. The time showing on the local clock 18 when the trigger pulse arrives at the GPS module is written into the timing register 19.

A cellular module measures the propagation delay correction before a communication channel is opened. A measurement of the propagation delay is one part of the handover process involved in opening a communication channel. The propagation delay is thus always known to a cellular module.

Now, the problem solved by the invention is in the situation where a GPS receiver (adapted as in FIG. 1 and so able to communicate with a cellular base station) enjoys favorable signal conditions and so can determine GPS time as a by-product of a position determination (i.e. as an output of a so-called position-velocity-time (PVT) solution), but other GPS receivers in the same coverage area (or even other coverage areas) do not enjoy favorable signal conditions, and there are no LMUs available to help synchronize these other GPS receivers to GPS time. The idea of the invention is to have the GPS receiver 10 that can synchronize to GPS time (because it has good signal conditions) perform a PVT solution based on the ranging signals it receives and so synchronize itself to GPS time (at least at the instant for which the PVT solution applies), and then signal to the serving base station (through its cellular module 11) an actual (more precise) GPS time value for a time-stamped frame provided earlier by the base station, as in the above description. In other words, the base station provides a (time-stamped) frame (a possible time stamp occurring at a frame edge) and either a time-stamp value or no time-stamp value, and the GPS receiver adapted as in FIG. 1 and operating as described below, sends back a message to the base station telling the base station the GPS time value for the instant at which the time-stamped frame (the triggering frame) arrived at the GPS receiver. (In case the base station provides a time-stamped frame having no time stamp value, i.e. for which another frame does not provide a time value for the arrival of the time-stamped frame edge, the time-stamped frame serves only as a point of reference, i.e. an instant for which a time value is to be provided by the invention.) The difference in time between when the time-stamped frame is transmitted by the base station and when it is received can be taken into account in several different ways (such as by having the base station do the propagation delay accounting based on the timing advance it measures for the GPS receiver), none of which are the subject of the invention; and for purposes of the description here, the propagation delay is assumed to be negligible.

Referring again to FIG. 1, to understand the invention, it is necessary to understand some limitations of how the GPS receiver 10 functions. First, frame edges of downlink frames are detected by the rollover of the frame counter 20, which synchronizes itself to the incoming data frames (transmitted by the base station 24); the GPS module has no control over the operation of the frame counter. Triggering occurs only from the cellular module 11 to the GPS module 12, never in the other direction. Uplink data frames (that is, e.g. speech data being communicated by the cellular component 11 to the base station 24) cannot be GPS-time stamped accurately due to unknown delays in the cellular transmitter (of the cellular transceiver 25) and protocol stacks (implemented in the cellular processor 22). The timing register 19 in the GPS module 12 can be triggered via the special hardware (external) connection, and once so triggered, will store the current reading of the GPS local clock (oscillator) 18. Frame edges are not synchronized with GPS PVT calculations; in other words, the GPS module cannot be made perform a PVT calculation at the instants of time at which frame edges from the base station arrive at the GPS receiver (cellular module 11), and so what might be called frame edge time is different from what might be called GPS PVT calculation time.

As a result of these constraints, several observations can be made. First, only the downlink data frames can be time-stamped. Second, in order to carry out data frame time-stamping with GPS time, the GPS module must be flexible, i.e. it must provide GPS time for instants of time at which triggers are received, instead of controlling the trigger module to provide triggers at instants of time at which PVT solutions apply. Third, because frame edges are not synchronized with a GPS PVT calculation, there must be a way to measure the time difference between the instant a frame edge (Frame number) is time stamped and the instant to which the (latest) PVT calculation applies.

What the invention provides therefore is a way to timestamp data frames in the cellular phone with GPS-time, given the above constraints and observed consequences.

Figure 2:
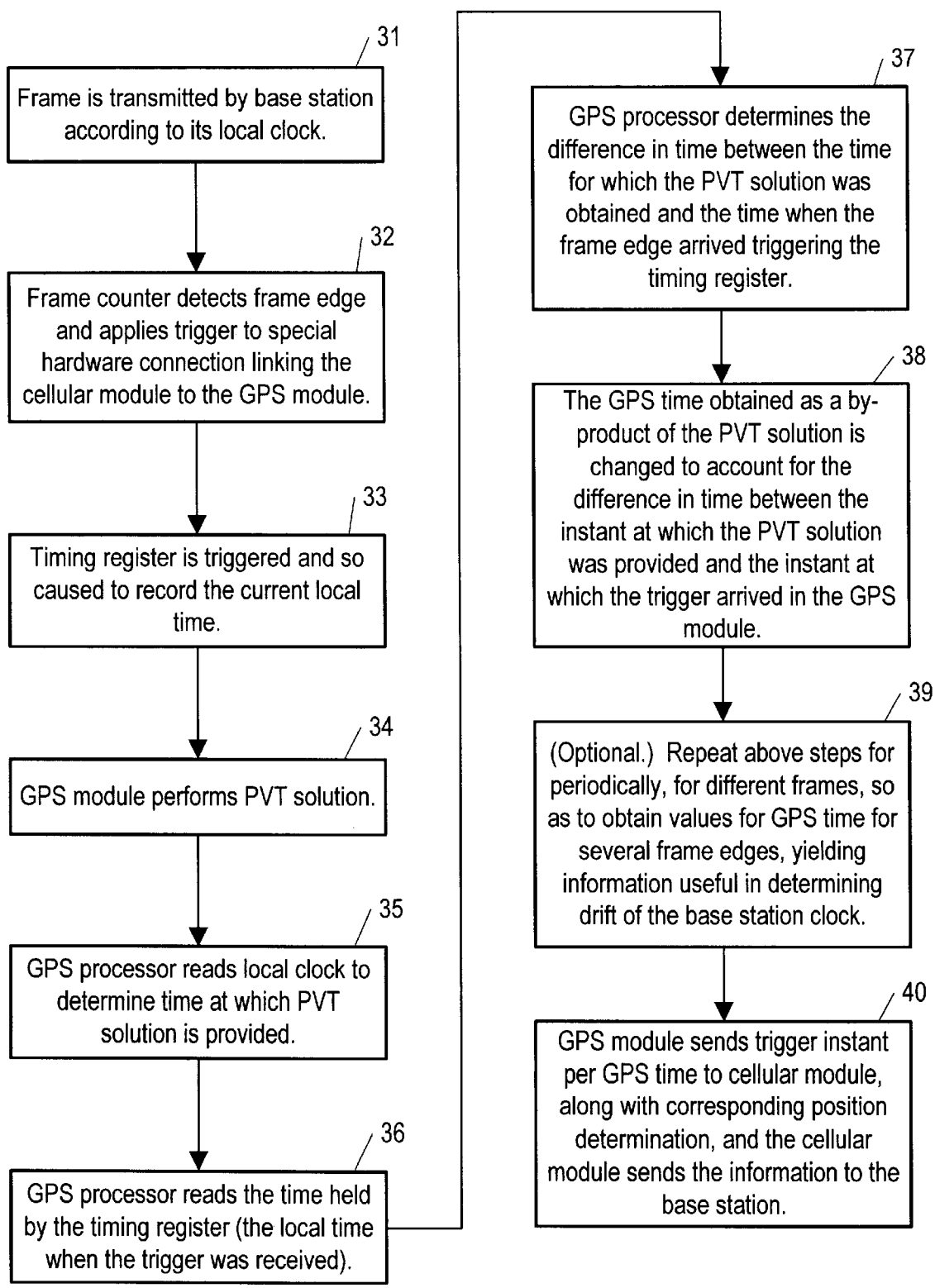
FIG. 2 is a flowchart of a method by which the GPS component of FIG. 1 synchronizes to GPS time and then communicates GPS time to the cellular component, which can then communicate GPS time to other GPS receivers adapted as in FIG. 1.

Referring now to FIG. 2 and also to FIG. 1, the method provided by the invention is as follows. In a first step 31, a (downlink) frame is transmitted by the base station 24 according to a local clock (not shown). In a next step 32, the frame counter 20 of the cellular module 11 detects the frame edge of the transmitted (downlink) frame and applies a trigger to the special hardware connection 29 linking the cellular module to the GPS module 12. The trigger signals to the GPS module the arrival of the frame (edge) in the cellular module, causing, in a next step 33, the timing register 19 of the GPS module to record the current reading of the local clock 18. In a next step 34, the GPS module performs a PVT solution (using any of various known algorithms, such as a least squares algorithm, or navigation filters, such as an extended Kalman filter). In a next step 35, the time according to the local clock for which the PVT solution applies (i.e. the time at which the PVT solution is provided) is recorded by the GPS processor 21. Then in a next step 36, the GPS processor reads the time held by the timing register, which indicates, per local clock time, the instant of arrival of the frame edge arriving just prior to obtaining a PVT solution. Then in a next step 37, the GPS processor determines the difference in time between the time for which the PVT solution was obtained and the time when the frame edge arrived triggering the timing register. (The GPS local clock/oscillator 18 is typically a 50 MHz oscillator, giving a so-called jitter of only 6 m, determined from the formula $1/50 \times 10^6 \times c$, where c is the speed of light). In a next step 38, the GPS time obtained as a by-product of the PVT solution is corrected for the difference in time between the instant at which the PVT solution was provided and the instant at which the trigger arrived in the GPS module, so as to obtain the GPS time corresponding to the trigger, thus relating a frame edge instant of arrival (for a frame with a known frame number) to GPS time. In a next (optional) step 39, the above steps are repeated periodically, so as to obtain values for GPS time for several sequential frame edges, and the base station or the GPS receiver can then estimate the clock drift for the base station clock (not shown) used in timing frame transmissions. In next step 40, the GPS module sends the GPS time for the instant it received the trigger to the cellular module (along with, optionally, a corresponding position determination, as described below), and the cellular sends the information to the base station in an uplink frame.

Referring again to FIG. 1, it should also be understood that the invention comprehends using the PVT solution determined by the ranging component (12) (FIG. 1) for calculating the propagation delay between the ranging receiver 10 and the base station serving the cellular component 11. Preferably, the GPS processor 21 adjusts the position of the ranging receiver 10 so as to correspond to the instant of time at which the trigger was received by the GPS module 12. Then, along with the time mark the cellular component sends back to the base station enabling the base station to synchronize to GPS time, the receiver can also send back to the base station in the uplink frame the position determined from the PVT solution (adjusted to the trigger time), as indicated in FIG. 1 and FIG. 2, for use by the base station in calculating propagation delay for signals sent to the ranging receiver cellular component 11 from the base station (as an alternative to the base station calculating propagation delay via a timing advance procedure, which provides only relatively poor accuracy, to within a few microseconds, corresponding to a few hundreds of meters in position).

It should be understood that a base station need not provide a time-stamp for a time-stamped frame in order for the invention to work. A GPS receiver adapted to use the invention can provide the GPS time of arrival of a frame edge of any frame (identified by its frame number) without using a time stamp value for a time-stamped frame (edge) in arriving at a PVT solution. In the usual mode of operation, as explained above, the GPS receiver operating according to the invention is operating in favorable signal conditions and so readily determines an accurate PVT solution without having to rely on assistance by the cellular network. In general, however, a GPS receiver operating according to the invention provides what amounts to a correction to a time stamp value provided by a base station, the correction providing a more precise GPS time of arrival of the time-stamped frame. In other words, referring again to FIG. 1, in general, the GPS receiver 10 receives both a time-stamp value frame, conveying an estimated GPS time for a triggering frame (i.e. an estimate of when the triggering frame will arrive at the GPS receiver and be received by the cellular module 11), and also the triggering frame (the time-stamped frame). It then determines a more precise GPS time for the time-stamped frame as described above, and then sends the correction back to the base station 24, in effect saying, "Hey base station, you sent me a frame edge that you said I would receive at X o'clock GPS time, but the time you gave me was Y seconds behind the correct time."

Use of a (cellular signal) frame counter (or a time slot counter, bit counter, or, in a CDMA system, a chip counter, or other, similar devices), which would have to be provided as additional equipment in a GPS, is just one way to implement the present invention, and it is the preferred embodiment for some applications, applications where it is not necessary to have the highest possible accuracy. In case of GSM cellular communication, a frame counter can be used to generate a trigger pulse at a frequency of 216.68 Hz. It is also possible to generate trigger pulses at the time slot rate (there being eight time slots per frame) using a time slot counter; use of the time slot rate would give a trigger pulse at a frequency of 1733.4 Hz. It is possible to generate a trigger pulse at an even still higher frequency; using the bit rate 156.25 bits per time slot would give a trigger pulse at a frequency of 270844.17 Hz (i.e. using a data bit counter instead of the frame counter would in the case of a GSM cellular communication signal provide a trigger pulse at a frequency of 270844.17 Hz). In other cellular systems besides GSM, data rates and data structures are of course different, and the invention is not intended to be restricted to GSM cellular communication.

To implement the present invention, a typical GPS receiver would have to be modified to include a cellular module with at least the functionality indicated above, as well as hardware for providing the trigger pulse and the hardware associated with the clock register.

There are other uses for an absolute time reference besides assisting GPS receivers in recovering GPS time. Absolute time can also be used to measure drift of cellular base station clocks with respect to GPS time (as noted above), and to measure time differences between neighboring base stations. Such measurements are needed for example in network-based positioning methods including Enhanced Observed Time Difference (E-OTD) and Time of Arrival (TOA) positioning methods.

Note that in case of the base station providing an initial estimate of GPS time for a trigger, it is not necessary that the cellular module 11 construct the time-mark message. The cellular module in some applications sends only a "Register triggered with Frame No. 1022" message to some other entity, which may reside outside of the GPS receiver or may be the GPS module, and that other entity calculates the time-mark.

Note also that although the invention has been shown and described in the preferred embodiment in which the GPS module 12 includes a (local) clock 18, in other applications the clock used by the GPS module to provide (local) time is located outside of the GPS module. For example, the clock is in some applications shared with some another entity such as the cellular module. The clock used by the GPS module can even reside outside of the GPS receiver.

It should also be noted that the invention is of use in providing a basis for setting the clock used by a module which is other than a GPS module. The invention should be understood to be of use in setting the clock used by any application that requires some version of universal time, and in particular, other ranging receiver applications besides GPS receivers, including for example ranging receivers for use with the Russian Global Navigation Satellite System (GLONASS) positioning system.

SCOPE OF THE INVENTION

It is to be understood that the above-described arrangements are only illustrative of the application of the principles of the present invention. Numerous other modifications and alternative arrangements may be devised by those skilled in the art without departing from the scope of the present invention, and the appended claims are intended to cover such modifications and arrangements.

What is claimed is:

1. An apparatus (10), comprising:
    a) a cellular module (11), responsive to a portion of a downlink frame signal conveying a cellular frame provided by a cellular communication system; and
    b) a main module (12), responsive to ranging signals from beacons (27) of a positioning system in which time is kept according to a predetermined time reference;
    the apparatus characterized in that:
        the cellular module (11) provides a trigger signal indicating the arrival of the portion of the downlink frame signal, and is further responsive to a signal indicating information for relating the instant at which the trigger signal is provided to a time value according to the predetermined time reference; and
        the main module (12) provides the signal indicating the information for relating the instant at which the trigger signal is provided by the cellular module (11) to a time value according to the predetermined time reference;
    wherein the trigger signal is provided over a connection (29) between the cellular module (11) and the main module (12) so constructed that any delay between sending and receiving the trigger signal is either negligible or can be determined.

2. The apparatus of claim 1, further characterized by the main module (12) comprising a timing register (19) and a local clock (18), the timing register (19) responding to the trigger signal by reading the local clock to determine a local trigger time and holding the local trigger time until being reset or until another trigger signal is issued by the cellular module (11).

3. The apparatus of claim 2, further characterized in that the main module (12) further comprises a main processor (21), responsive to the ranging signals and to the value stored in the timing register (19) and to the local time as indicated by the local clock (18), for determining a navigation solution including a preliminary time value according to the predetermined time reference, the preliminary time value being a time value for the instant of time for which the navigation solution is determined, and for adjusting the preliminary time value by the difference in time according to the local clock (18) when the timing register (19) was triggered and when the navigation solution was determined, thereby providing the time value, according to the predetermined time reference, for the instant when the timing register (19) was triggered.

4. The apparatus of claim 1, further characterized in that the apparatus further comprises a time slot counter, and the trigger pulse is provided when the time slot counter indicates a new time slot.

5. The apparatus of claim 1, further characterized in that the apparatus further comprises a data bit counter, and wherein the trigger pulse is provided when the data bit counter indicates a new data bit.

6. The apparatus of claim 1, further characterized in that the main module (12) is a global positioning system (GPS) module providing functionality for operation as a GPS receiver, and the predetermined time reference is time according to the global positioning system.

7. The apparatus of claim 1, further characterized in that the cellular module (11) provides to a base station of the cellular communication system the information for relating to a time value according to the predetermined time reference, the instant at which the trigger signal is provided by the cellular module (11) to the main module (12).

8. The apparatus of claim 7, further characterized in that the main module (12) also provides a position for the instant when the trigger signal was received by the main module (12), and the cellular module (11) is responsive to the position, and provides the position to the base station.

9. A system, comprising an apparatus according to claim 7, and further comprising the beacons (27) of the positioning system that provide the ranging signals and also comprising the base station receiving the information for relating to a time value according to the predetermined time reference, the instant at which the trigger signal is provided.

10. A system, comprising an apparatus according to claim 1, and further comprising the base station (24), for providing the cellular frame.

11. A system, comprising an apparatus according to claim 1, and further comprising the beacons (27) of the positioning system that provide the ranging signals.

12. A method for having a ranging receiver (10) operative in communication with a positioning system and also operative in communication with a cellular communication system provide information to a base station of the cellular communication system of use in enabling the base station to synchronize to time according to the positioning system, the ranging receiver including a cellular module (12) adapted for communication with the cellular communication system and also including a main module (12) adapted for communication with the positioning system, the method characterized by:

a) a step (32) in which the cellular module (11) detects a portion of a time-stamped frame and applies a trigger signal to a connection linking the cellular module (11) to the main module (12), a connection so constructed that any delay between applying a signal and receiving the signal is either negligible or can be determined; and b) a step (40) in which the main module (12) sends to the cellular module (11) a time value according to the positioning system for the instant when the main module (12) received the trigger signal, based on performing a navigation solution yielding a time value for an instant of time able to be related to the instant of time when the trigger signal was received using a local clock (20) accessible to the main module (12).

13. The method of claim 12, further characterized by a step (37) in which the main module (12) determines the difference in time between the time for which the navigation solution was obtained and the time when the trigger signal arrived at the main module (12), based on using a local clock (18) and a timing register (19) latchable by the trigger signal so as to hold a time value according to the local clock (18) for when a trigger signal arrives.

14. The method of claim 13, further characterized by a step (38) in which the main module (12) uses the difference in time between the time for which the navigation solution was obtained and the time when the trigger signal arrived at the main module (12) to adjust a position determination so as to correspond to position when the trigger signal was received by the main module (12).

15. The method of claim 14, further characterized by a step (38 40) in which the main module (12) also provides a position for the instant when the trigger signal was received by the main module (12), and the cellular module (11) is responsive to the position, and provides the position to the base station.

16. The method of claim 13, further characterized by a step (40) in which the cellular module (11) provides to the base station the information for relating to a time value according to the positioning system, the instant at which the trigger signal is provided.

17. The method of claim 12, further characterized in that in the step (40) in which the main module (12) sends to the cellular module (11) a time value, the main module (12) also sends the cellular module (11) a signal indicating information about the position of the ranging receiver.

* * * * *